INVENTORS
GEORGE J. LAURER
CARL D. SOUTHARD
BY Leo J. Aubel
ATTORNEY

EVEN READ

| POSITION | ODD | EVEN | DATA |
|---|---|---|---|
| 20 | | READ | (XXX= DATA STORED) |
| 21 | REWRITE | | X X X |
| 22 | | READ | X X X |
| 23 | REWRITE | | X X X |
| 24 | | READ | X X X |
| 25 | WRITE | | X X X |
| 26 | | NO READ | X X X |
| 27 | NO WRITE | | WRITE NEW DATA |

FIG. 2a

ODD READ

| POSITION | ODD | EVEN | DATA |
|---|---|---|---|
| 20 | | REWRITE | (XXX = DATA STORED) |
| 21 | READ | | X X X |
| 22 | | REWRITE | X X X |
| 23 | READ | | X X X |
| 24 | | REWRITE | X X X |
| 25 | READ | | X X X |
| 26 | | WRITE | X X X |
| 27 | NO READ | | X X X |
| 28 | | NO WRITE | WRITE NEW DATA |

FIG. 2b

United States Patent Office 3,146,429
Patented Aug. 25, 1964

3,146,429
DRUM STORAGE SYSTEM

George J. Laurer and Carl D. Southard, Endwell, N.Y., assignors to International Business Machines Corporation, New York, N.Y., a corporation of New York
Filed June 30, 1961, Ser. No. 121,062
5 Claims. (Cl. 340—174.1)

Figure 1:
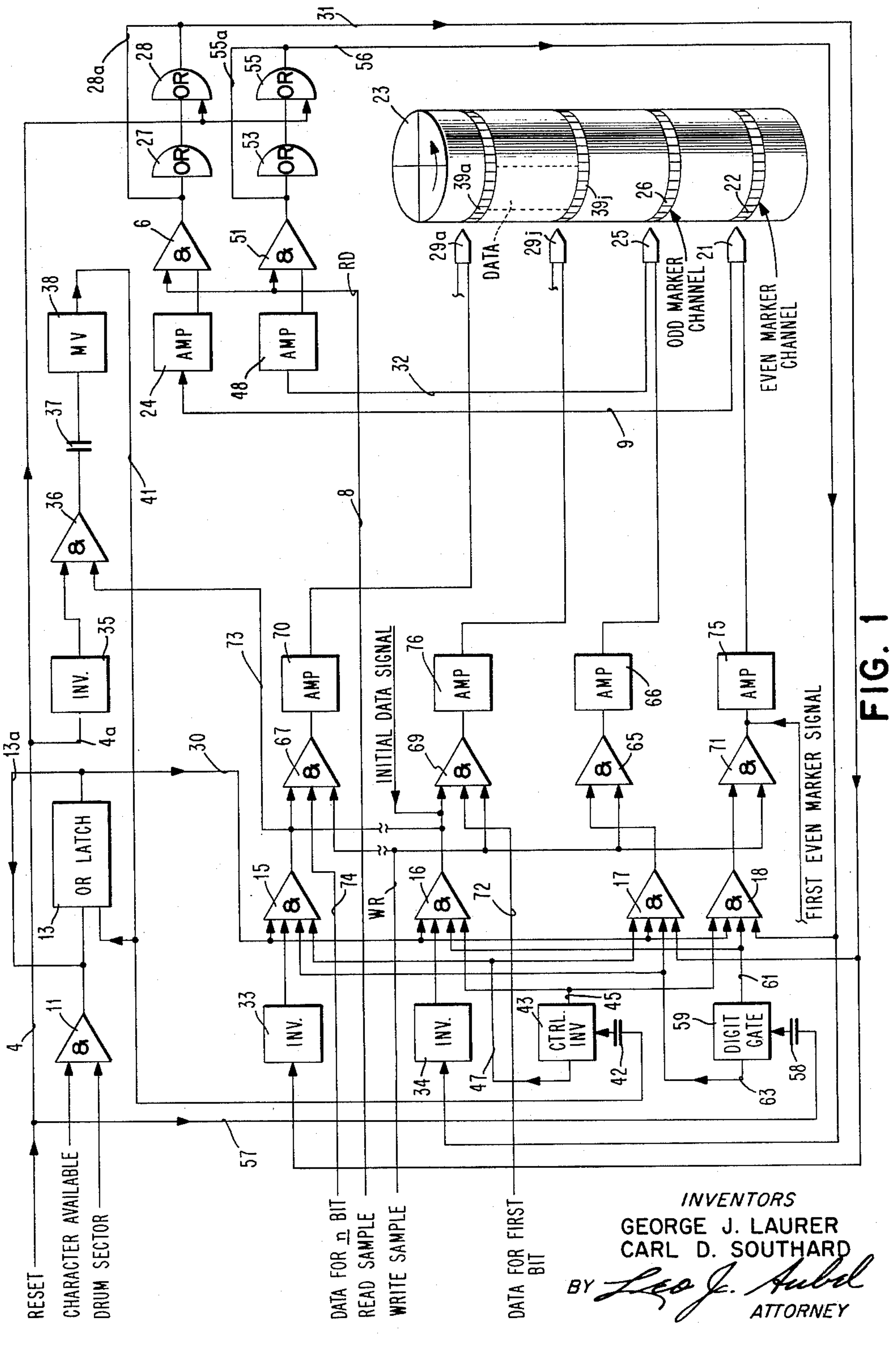

The present invention relates to systems for storing digital data presented in serial form, and more particularly to a system for storing data on magnetic drums.

When storing data on magnetic drums, it is necessary to indicate whether each of the successively presented drum register positions is full or empty, and the resulting indication must then be used to control translation of data from a selected source to the first empty drum register position.

Accordingly, it is a principal object of the present invention to provide improved circuitry for controlling the writing of data on a storage drum.

In some computers utilizing magnetic storage drums, marker signals are utilized to indicate the location where each particular bit of data must be recorded or from where each bit of data must be read out.

It is therefore another object of the present invention to provide an improved drum marker system.

In the attainment of the foregoing objects, a drum marker system is provided in which a plurality of data recording channels and two marker recording channels are used, namely, an odd marker and an even marker channel. In one condition, the circuit is arranged to read the markers formed on the odd marker channel and write markers on the even marker channel at a succeeding bit position and vice-versa. When a marker is not read at a bit position of the odd marker channel, it will cause data to be read into the succeeding bit position of the data channels. When data is read into the data channels, the system is arranged to trigger circuits to a second condition to read the markers in the even marker channel and to write markers in the odd marker channels at succeeding bit positions. The operation is repetitive, that is, when a marker is not read on the even channel, data is caused to be read into the next successive data channel position and to actuate the trigger circuits to read odd markers, etc. By means of the foregoing system, data is entered into the first empty bit position of the data channels.

The foregoing and other objects, features and advantages of the invention will be apparent from the following more particular description of a preferred embodiment of the invention, as illustrated in the accompanying drawings.

In the drawings:

FIG. 1 is a schematic diagram of a drum marker circuit in accordance with the invention;

FIGS. 2*a* and 2*b* show some position relationships useful in explaining the operation of the invention.

A suitable magnetic storage drum arrangement for use in the data storage system of the present invention is indicated in FIG. 1. The drum 23 is driven by suitable motors to have a relatively constant angular velocity. The drum is constructed to have a surface of magnetic material. As the drum rotates, fixedly mounted magnetic heads 21, 25 and 29*a* . . . 29*j* are positioned parallel to the longitudinal axis of the drum to transfer information to and from the magnetic surface of the drum by recording or writing binary data in the form of electromagnetic flux patterns and later detecting or reading these patterns.

In the particular embodiment indicated, the drum is divided into four data storage sectors 1–4 indicated by the lines which sector the end of the drum 23 and has ten data storage channels 39*a*–39*j*. It will, of course, be understood that the number of data channels may be varied dependent on the number of bits that are to be entered concurrently, that is, in parallel. Additional channels, indicated as odd and even marker channels 22 and 26 respectively, are utilized for marking the position of the data bits stored in the data channels of the drum and the storage condition of the data channels, as will be explained in detail hereinbelow.

The writing heads 29*a*–29*j* and the marker heads 21 and 25 are mounted to have a small gap between the head and the drum surfaces, as is conventional. As known, if the small electromagnetic flux pattern written by a magnetic head is positive, it is assumed to be a binary one; if the flux pattern is negative, it is considered to be a zero. Once written, a bit is stored on the drum without distortion unless the information is deliberately erased.

The individual components of the marker system of the invention such as the AND, OR, inverter, latch and multivibrator circuits are standard units of any suitable type known in the art. The foregoing components are not, per se, part of the invention and will therefore not be described in detail.

The system includes timing rings of any suitable type, not shown, which register 0–99 digit positions in each sector in response to drum rotation, and sector timing rings also of any suitable type, not shown, which register which of the sectors 1, 2, 3 or 4 is adjacent the magnetic heads at that instant as the drum rotates.

The operation of the circuits of FIG. 1 is as follows. First it will be understood that the drum storage system of FIG. 1 is a part of a complete data system of any suitable known type which includes control circuits for providing control signals to the drum circuits. An example of such a system is shown in U.S. Patent 2,798,554 to C. B. Smith entitled Data Transfer Apparatus and assigned to the same assignee as the present invention.

During operation, write sample pulses WR are continuously coupled from control circuits, not shown, through line or lead 7 (the terms line and lead are used interchangeably throughout), to AND gates or circuits 65, 67, 69 and 71 and read sample pulses RD are continuously coupled through lead 8 to AND circuits 6 and 51, for purposes to be explained hereinbelow.

Control circuits, not shown, provide a signal through lead 5 indicating that a bit of data is available for storage, and another signal for indicating the sector of the drum into which the data is to be entered through lead 10 to AND circuit 11; coincidence of these two signals cause AND circuit 11 to conduct. The output of AND circuit 11 is coupled to activate a bistable latch circuit 13 which remains in a particular state or conducting condition to which it is activated due to the feedback connection 13*a*. The output of the latch circuit 13 is coupled through line or lead 30 to a group of AND gates or circuits 15, 16, 17 and 18.

A Reset signal is coupled through leads 4 and 4*a*, and inverter 35 to inhibit or prevent AND circuit 36 from conducting when it is applied. When AND circuit 36 stops conducting, a pulse is coupled through capacitor 37 to trigger a single shot multivibrator 38 to provide a pulse through lead 41 and capacitor 42 to activate a bistable multivibrator control 43 to shift its conducting condition. The reset signal is also coupled through lead 4 to OR circuits 28 and 55 to provide an output through leads 31 and 56 to inverters 33 and 34 respectively to develop a signal to cause AND circuits 15 and 16 to stop conducting, for purposes to be explained more fully hereinbelow.

When the Reset signal is removed from lead 4 AND circuit 36 starts conducting, a pulse is coupled from multivibrator 38 to provide a pulse through lead 41 and capacitor 42 to cause control multivibrator 43 to shift to a second conducting condition. In one conducting condition, bistable multivibrator 43 provides an even control signal through lead 47 to enable AND circuits 15 and 17. In its other conducting condition, trigger 43 provides an odd control signal through lead 45 to enable AND circuits 16 and 18.

The Reset signal is also coupled through lead 57 and capacitor 58 to actuate a digit gate 59 comprising a multivibrator to one or the other of its conducting conditions. In one conducting condition, digit gate 59 couples an even digit gate pulse through line 63 to AND circuits 15 and 17. In its other conducting condition, digit gate 59 provides an odd digit gate output through lead 61 to AND circuits 16 and 18. The digit gate 59 tends to eliminate noise since the associated AND circuits 15, 16, 17 and 18 will not pass signals unless enabled by the output pulse of digit gate 59.

Assume data is to be written or entered on the drum and that even control signals and even digit gates are being supplied from control multivibrator 43 and digit gate 59 through leads 47 and 63 respectively to AND circuits 15 and 17, and that magnetic head 21 is reading even markers on marker channel 22 of rotating drum 23. An output pulse is coupled from magnetic head 21 through lead 9 and amplifier 24 to AND circuit 6. Coincidence of the read sample signal RD with the pulse developed as magnetic head 21 reads an even marker causes AND circuit 6 to couple a signal to the latch circuit comprising OR circuits 27 and 28. OR circuit 27 and 28 provide a signal through lead 31 to AND circuit 17 and through leads 31 and 31*a* to inverter 33. AND circuit 17 has four input leads, namely, an input due to magnetic head 21 coupled through lead 31, an input from the digit gate 59 coupled through lead 63, an input from the control multivibrator 43 coupled through lead 47, and an input from the character available and drum sector signals coupled thereto through lead 30. Coincidence of the four input signals at AND circuit 17 causes this circuit to conduct and pass a signal to AND circuit 65. Coincidence of a signal from AND circuit 17 and the write sample signal WR coupled through lead 7 to the input of AND circuit 65 renders AND circuit 65 conductive and a signal is coupled through amplifier 66 and lead 79 to energize magnetic head 25 to write a marker on the odd marker channel 26 of drum 23. Because of the rotation of the drum, the odd marker is written into a position next succeeding the position at which magnetic head 21 reads the even marker.

As noted, the signal coupled from magnetic head 21 through leads 31 and 31*a* to inverter 33 causes inverter 33 to provide a signal to inhibit or prevent AND circuit 15 from conducting and thus AND circuits 67 and 69 are prevented from coupling data to the magnetic heads of the data channels as will be explained below.

The foregoing operation will continue until magnetic head 21 fails to read a marker, that is, senses the absence of a marker on the even marker channel at which time no output will be provided through lead 9, amplifier 24 and the above-named circuitry to AND circuit 17; this will cause AND circuit 17 to become nonconductive and, in turn, will cut-off AND circuit 65 to thus prevent the writing of an odd marker on the next succeeding position.

The absence of the signal from magnetic head 21 to inverter 33 causes AND circuit 15 to be enabled. Coincidence of the even digit gate coupled through lead 63 to AND circuit 15, of the character available and drum sector signal coupled through lead 30, and of the even control signal from control multivibrator 43 coupled through lead 47; and, the absence of the inhibit signal from inverter 33 causes AND circuit 15 to conduct and provide a signal to AND circuits 67 and 69. Coincidence at the input of AND circuit 67 of the write sample signal WR, the *n* data bit signal coupled through lead 74, and the signal from AND circuit 15 causes AND circuit 67 to pass a signal through amplifier 70 and lead 83 to read-write magnetic head 29*a* to insert or write a bit of binary data on drum data channel 39*a*. Likewise, coincidence at the input of AND circuit 69 of the write sample WR, the 1st data bit signal coupled through lead 72, and the signal from AND circuit 15 causes AND circuit 69 to pass a signal through amplifier 76 and lead 85 to the read-write magnetic head 29*j* to insert or write a bit of data on drum data channel 39*j*.

Because of the rotation of the drum, the data will be written into a position next succeeding the position at which magnetic head 25 senses the absence of an odd marker.

As noted above, the number of data channels and circuitry corresponding to AND circuits 67 and 69, amplifiers 70 and 76 and magnetic heads 29*a* and 29*j* is determined by the number of bits to be entered in parallel into drum 23.

An output from AND circuit 15 is also coupled through lead 73 and 73*a* to cause AND circuit 36 to couple a signal through capacitor 37 to multivibrator 38 which provides a pulse through lead 41 and capacitor 42 to shift control multivibrator 43 to its other conducting condition and thus provide a pulse through lead 45 to enable AND circuits 16 and 18.

A reset signal is also provided at this time through lead 57 and capacitor 58 to reset digit gate 59 to provide an output through odd digit gate line 61 to AND circuits 16 and 18.

The circuit will now be conditioned to receive the signals developed as magnetic head 25 reads the markers on odd marker channel 26. Magnetic head 25 provides an output through lead 32 and amplifier 48 to AND circuit 51. Coincidence of the read sample signal RD and the signal from amplifier 48 will cause AND circuit 51 to conduct and pass a signal to OR circuits 53 and 55 which latch to a conducting condition due to feedback lead 55*a*. The output from latch circuit consisting of OR circuits 53 and 55 is coupled through lead 56 to AND circuit 18 and also through leads 56 and 56*a* to inverter 34. The output of inverter 34 is arranged to provide an output to inhibit AND circuit 16; therefore, the character available and sector signals are prevented from passing through AND circuit 16 at this time.

Coincidence of the four inputs at AND circuit 18, namely, the signal developed when magnetic head 25 reads an even marker, the odd digit gate, the character available signal coupled through lead 30 and the output from the control multivibrator 43 causes AND circuit 18 to conduct and pass a signal to AND circuit 71. Coincidence of the write sample signal WR and the signal from AND circuit 18 at the input of AND circuit 71 causes AND circuit 71 to pass a signal through amplifier 75 and lead 81 to cause magnetic head 21 to write a marker on the even marker channel 22. Because of the rotation of the drum, the even marker is entered into the position next succeeding the one at which magnetic head 25 reads the odd marker.

When magnetic head 25 senses the absence of a marker on the odd marker channel 26, no output will be provided through lead 32 to amplifier 48 and the above-named circuitry to AND circuit 18. The foregoing will cause AND circuit 18 to become nonconductive and, in turn, will cut-off AND circuit 71 to thus prevent the writing of an even marker on the next succeeding position. When magnetic head 25 fails to provide a signal to inverter 34, the inverter output, or lack thereof, permits AND circuit 16 to be enabled. Coincidence of the odd digit gate coupled through lead 61 to AND circuit 16, of a character available and drum sector signal, and of the odd control signal from control multivibrator 43; and, the absence of the inhibiting signal from inverter 34 causes AND circuit 16 to conduct to provide a signal to AND circuits 67 and 69. Coincidence at the input of AND circuits 67 and 69 of the write sample signal WR, the respective data signal and the signal from AND circuit 16 causes AND circuits 67 and 69 to pass respective signals through amplifiers 70 and 76 to cause read-write magnetic heads 29a and 29j to write bits of binary data on drum data channels 39a and 39j respectively. Because of the rotation of the drum, the data is entered into a position next succeeding the position at which the magnetic head senses the absence of an odd marker.

Regressing briefly, the initiation of the data insertion operation is as follows. In this embodiment, when the drum time digit 09 signal in the selected one of the four sectors is coincident with a signal provided by external circuits, not shown, to indicate that the first bit of data is not on the drum, a first even marker signal is generated which may be provided through lead 87 and amplifier 75 to cause magnetic head 21 to write the first even marker in drum position 10. Once the first marker is written, the first even marker signal is cut off. Also, an initial data signal is provided through lead 89 to enable AND circuits 67 and 69 to cause magnetic heads 29a and 29j to enter the initial data in drum position 11 of the selected sector. Once the initial data is entered, the initial data signal is cut off. The circuit of FIG. 1 then continues to operate, as described above, beginning with the odd marker read cycle.

The positioning of the data, that is, the insertion of the data into its respective position may be understood by reference to FIGS. 2a and 2b. Assume the circuit is reading the markers on the even marker channel 22 of the rotating drum 23, FIG. 2a. Assume also that data is stored in the corresponding position of the data channels. When magnetic head 21 reads an even marker at position 20, it will control the circuit, as indicated above, to cause an odd marker to be written on the succeeding position, that is, position 21, of the drum. If a marker has already been written in position 21, the writing of a marker in position 20 will merely cause a marker to be rewritten. If a marker is read in position 22, it will cause a marker to be rewritten on the odd marker channel position 23.

Assume that prior to this, no marker has been written in odd channel position 25. When the magnetic head 21 reads a marker on position 24, it will cause a new marker to be written in position 25 of the odd marker channel. At position 26, there is no marker on the even marker channel; thus, the magnetic head will not provide a pulse to actuate circuitry to write an odd marker, and consequently no marker will be written in odd channel position 27. The absence of a marker in position 26 will cause inverter 33 to permit AND circuit 15 to conduct and energize the associated magnetic heads to write new data in data position 27. When data is written in position 27, a signal is provided from AND circuit 15 through lead 73 to AND circuit 36. AND circuit 36 will provide a pulse through capacitor 37 to multivibrator 38 which will, in turn, provide a signal through lead 41 to control multivibrator 43 to shift its conducting condition and thereby condition the circuit to read the markers on the odd marker channel 26.

Assume that during the ensuing rotation of drum 23 that the magnetic heads pass drum position 21. Magnetic head 25 will read a marker on the odd channel position 21 and cause a marker to be rewritten on the even channel 22, see FIG. 2b. A marker will be read in odd position 23 and will cause an even marker to be written in even position 24; and, a marker will be read in odd position 25 and will cause a marker to be written in even position 26. No marker will be read in odd position 27; thus, no marker will be written in even position 28. As before, the circuitry will be actuated to cause the associated magnetic heads in the data channels to read new data and this data will appear in data position 28.

The circuit will continue to operate to enter data as long as there is data available to be entered into this sector and until the drum timing ring reaches a given count, in this embodiment the digit count 91, which causes the input circuits to be deactivated. Note, of course, that there are four sectors in the drum and that each sector is available for receiving data.

The circuitry for reading the data out of the drum is not, per se, a part of this invention, accordingly, it will not be described in detail. However, once the markers and data are on the drum, the read out circuits may be of a suitable known type and may, for example, be similar to that shown in U.S. Patent 2,798,554 to C. B. Smith, supra.

The invention thus provides an improved means for controlling the writing of data on a storage drum, and particularly a means of registering position markers on a storage drum and for writing data into the first empty drum position.

While the invention has been particularly shown and described with reference to a preferred embodiment thereof, it will be understood by those skilled in the art that the foregoing and other changes in form and details may be made therein without departing from the scope of the invention.

What is claimed is:

1. A system for storing data comprising, in combination, a rotatable data storage drum having two marker channels for registering magnetic position markers and a plurality of data-receiving channels, a magnetic read-write head associated with each of said channels, circuit means for energizing each of said magnetic heads, the magnetic head for each marker channel developing a read signal in response to a passing marker, first gating means for coupling the read signal from the magnetic head of one marker channel to activate the associated circuit means to energize the magnetic head of the other marker channel to write a marker in said other marker channel, and second gating means for energizing the magnetic head for a data channel when the magnetic head for said one marker channel does not read a marker to thereby cause data to be written in said data channel succeeding bit position.

2. A system for storing data comprising, in combination, a rotatable data storage drum having two marker channels for registering magnetic position markers and a plurality of data-receiving channels, a magnetic read-write head associated with each of said channels, circuit means for energizing each of said magnetic heads, the magnetic head for each marker channel developing a read signal in response to a passing marker, first gating means for coupling the signal from the magnetic head of one marker channel to activate the associated circuit means for energizing the magentic head of the other marker channel to write a marker in said other marker channel, and second gating means activating associated circuit means for energizing the magnetic head for a data channel to write data in said channel when the magnetic head for said one marker channel detects the absence of a marker, and means responsive to the writing of data in said data channels for deactivating the circuits for the magnetic head for one marker channel and activating said circuits for the magnetic head for said other marker channel to read markers on said other marker channel.

3. A system for storing data comprising, in combination, a rotatable data storage drum having an odd and an even marker channel for registering magnetic position markers, and a plurality of data-receiving channels, a magnetic read-write head associated with each of said channels, circuit means connected to each of the magnetic heads for said channels, the magnetic head for each marker channel and the associated circuits developing an output signal in response to the sensing of a marker passing thereunder, first gating means for coupling the output signal from the magnetic head and circuit means for said odd marker channel to activate the circuit means for said even marker magnetic head to write a marker in said even marker channel, and second gating means for energizing the magnetic heads for said data channel when the magnetic head for said odd marker channel senses the absence of a marker to thereby write data in said data channels, trigger means for deactivating the circuits for said odd marker channel head and activating the circuits for said even marker channel head when data is entered into said data channels, third gating means for coupling the output signal from the magnetic head and circuits of said even marker channel to activate said circuit means for said odd marker head to write a marker in said odd marker channel, and fourth gating means for energizing the circuits for the magnetic heads for said data channels when the magnetic head for said even marker channel senses the absence of a marker to thereby write data in said data channel, whereby data is entered into the next empty position of each of said data channels.

4. A system as in claim 3 in which said circuit means for said channels include a digit gate circuit for positively enabling each said circuit means only during designated periods whereby noise in the system is minimized.

5. A system as in claim 3 in which said first gating means is enabled or opened by said odd marker pulses concurently as said third gating means is disabled by said odd marker pulses, and said second gating means is enabled by said even marker pulses concurrently as said fourth gating means is disabled by said even marker pulses whereby positive control is maintained of all data written on said drum.

References Cited in the file of this patent

UNITED STATES PATENTS

| | | |
|---|---|---|
| 2,984,827 | Trapnell et al. | May 16, 1961 |
| 2,988,735 | Everett et al. | June 13, 1961 |
| 3,045,217 | Housman et al. | July 17, 1962 |